US012073254B2

(12) United States Patent
Bydeley et al.

(10) Patent No.: US 12,073,254 B2
(45) Date of Patent: Aug. 27, 2024

(54) REAL TIME SENSE AND CONTROL USING EMBEDDED INSTRUCTION TIMING

(71) Applicant: Analog Devices International Unlimited Company, Limerick (IE)

(72) Inventors: David Kenneth Bydeley, San Jose, CA (US); Gary Wayne Ng, Campbell, CA (US); Gordon Alexander Charles, Sunnyvale, CA (US)

(73) Assignee: Analog Devices International Unlimited Company, Limerick (IE)

( * ) Notice: Subject to any disclaimer, the term of this patent is extended or adjusted under 35 U.S.C. 154(b) by 189 days.

(21) Appl. No.: 17/180,348

(22) Filed: Feb. 19, 2021

(65) Prior Publication Data

US 2021/0263777 A1 Aug. 26, 2021

Related U.S. Application Data

(60) Provisional application No. 62/978,994, filed on Feb. 20, 2020.

(51) Int. Cl.
*G06F 9/50* (2006.01)
*G06F 1/14* (2006.01)
*G06F 9/30* (2018.01)

(52) U.S. Cl.
CPC .............. *G06F 9/5038* (2013.01); *G06F 1/14* (2013.01); *G06F 9/30087* (2013.01); *G06F 9/5044* (2013.01)

(58) Field of Classification Search
CPC ...... G06F 9/5038; G06F 1/14; G06F 9/30087; G06F 9/5044
See application file for complete search history.

(56) References Cited

U.S. PATENT DOCUMENTS 5,822,381 A 10/1998 Parry et al.
7,710,944 B1 5/2010 Yoon
7,948,833 B2 5/2011 Ha et al.
8,417,981 B2 4/2013 Luskind et al.
8,583,957 B2 11/2013 Chandhoke et al.
8,891,716 B2 11/2014 Takahashi et al.
9,104,343 B2 8/2015 Ruesch et al.
(Continued)

FOREIGN PATENT DOCUMENTS

CN 107145467 9/2017
CN 103918238 7/2018
(Continued)

*Primary Examiner* — Eric C Wai
(74) *Attorney, Agent, or Firm* — Schwegman Lundberg & Woessner, P.A.

(57) ABSTRACT

A system for providing synchronous access to hardware resources includes a first network interface element to receive a network time signal from a data communication network and a memory to store sequence of one or more instructions selected from an instruction set of the first processing circuit. The sequence of one or more instructions include a first instruction that is configured to synchronize execution of a second instruction of the sequence of one or more instructions with the network time signal. The system further includes a first processing circuit to use the first instruction and a timing parameter associated with a second instruction to execute the second instruction in synchrony with the network time signal.

17 Claims, 6 Drawing Sheets

600

RECEIVE A NETWORK TIME SIGNAL — 605

RECEIVE A SEQUENCE OF ONE OR MORE INSTRUCTIONS SELECTED FROM THE INSTRUCTION SET OF A PROCESSING CIRCUIT — 610

EXECUTE, USING THE PROCESSING CIRCUIT, AN INSTRUCTION FROM THE SEQUENCE OF INSTRUCTIONS IN SYNCHRONY WITH THE NETWORK TIME SIGNAL — 615

(56) References Cited

U.S. PATENT DOCUMENTS

| | | | |
|---|---|---|---|
| 9,104,418 B2 | 8/2015 | Warneke et al. | |
| 9,544,374 B2 | 1/2017 | Callaghan et al. | |
| 9,582,443 B1 * | 2/2017 | Switzer | G06F 13/28 |
| 10,158,442 B1 | 12/2018 | Volpe | |
| 10,514,465 B2 | 12/2019 | Namineni et al. | |
| 11,106,565 B2 * | 8/2021 | Oliverio | G06F 9/52 |
| 2007/0110023 A1 * | 5/2007 | Bennett | H04W 56/0015 370/503 |
| 2008/0181179 A1 * | 7/2008 | Karaoguz | H04W 36/14 370/331 |
| 2020/0301740 A1 * | 9/2020 | Gabrielson | G06F 9/505 |

FOREIGN PATENT DOCUMENTS

| | | |
|---|---|---|
| CN | 111752335 | 10/2020 |
| EP | 2042957 | 8/2018 |
| WO | 0190865 | 11/2001 |
| WO | 2020047126 | 3/2020 |

* cited by examiner

REAL TIME SENSE AND CONTROL USING EMBEDDED INSTRUCTION TIMING

CLAIM OF PRIORITY

This application claims priority to U.S. Provisional Application Ser. No. 62/978,994, filed on Feb. 20, 2020, which is herby incorporated by reference in its entirety.

FIELD OF THE DISCLOSURE

This document pertains generally to computing systems, but not by way of limitation, to providing precision timing access to hardware resources in a computing system.

BACKGROUND

Computing systems are often used as a core component of systems that execute processes or tasks that require precise or deterministic timing. These systems can include processing circuits that interface with one or more shared resources, such as a shared communication channel or hardware resource, to monitor, process, and respond to, events. The selection of a suitable processing circuits for use in these systems can require balancing hardware- and software-based implementation of aspects of the system. While hardware implementations can precisely execute multiple processes in parallel, such implementations can be time consuming, expensive to develop, inflexible, and energy inefficient. Software based solution may be less susceptible to these drawbacks, but such solutions are often based on large scale operating systems that can lack timing precision, predictability, and energy efficiency. Microcontroller based solutions have historically filled the space between hardware-based implementations and software-based implementations. One reason for this popularity is that Microcontroller based solutions offer efficient low-level software access to hardware resources, such as through the use of assembly language programming, without the intervening layers of abstraction that are attendant in high-level software solutions.

Figure 1:
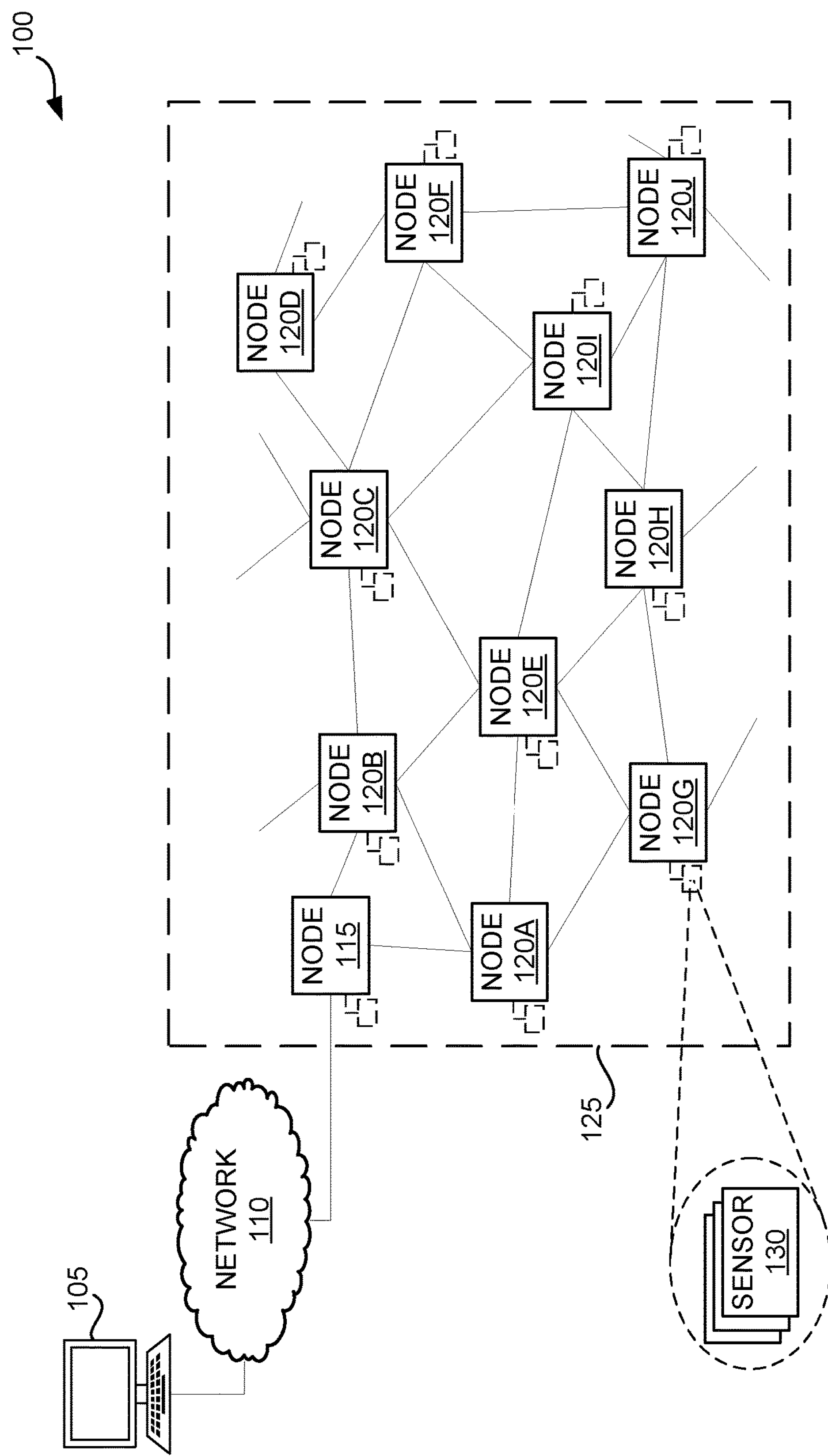
FIG. 1 is a block diagram that depicts an example of a system having computing nodes that utilize precision timed access to hardware resources.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure includes techniques for programmatically providing precision time access to hardware resources of a computing node. These techniques are useful in systems of networked devices, such as a mesh network of computing nodes, for providing precise deterministic access to hardware resources (e.g., memory, input-output interfaces, interconnect fabrics, or communication channels). Such deterministic access is provided by enabling the execution of instructions with in predetermined discrete time slots that may be synchronized to a shared common network time or network clock. Aspects of the present disclosure include a custom processing circuit script language that include programming constructs (e.g., script language commands) that are configured to execute in specified amount of time. Such programming constructs enable users to program the precise control of hardware resources using scripts which are deterministically executed by a processing circuit with sub-microsecond timing resolution. These techniques can increase the timing precision of sensing and actuation control for systems, such as industrial mesh networks, without the development costs associated with purely hardware-based implementations.

Aspects of the present disclosure are based on the recognition that as microcontrollers have grown in complexity, the development of applications that use these devices have migrated to the use of compiled language-based solutions, such as provided by structured or object-oriented computer programming language, such as 'C' or 'Java'. Compiled language-based solutions, however, can abstract instruction order and timing, thereby changing the instructions and the timing relationship between instructions as part of the compilation process. Additionally, as solutions become more complex, they can require the incorporation of real-time operating systems that arbitrate bus or processor access between tasks. This can lead to uncertainty or variations in the timing between the execution of instructions. Such uncertainty can lead to inaccurate timing of data collection or inconsistently timed actuation of peripheral devices.

In addition to the aforementioned timing uncertainty introduced by the use of compiled languages and real-time operating systems into microcontroller-based applications, compiled language-based solutions are typically implemented with counters or loops based on clock frequencies whose variation between systems can lead to further timing uncertainty. In an example, system clocks can drift or vary from one system to another. As a result, software that is tuned to run precisely on one system or instance of a hardware platform based on that system's clock may not run as accurately on another system or hardware platform. In view of this, system level synchronization techniques that use counters that are based on typical clock frequencies may not be accurate at fine timing granularities. Additionally, these counter-based synchronization techniques can require a developer to work in units of periods or clock ticks rather than real time units, further complicating the development process for applications that integrate these techniques.

Aspects of the present disclosure addresses problems in current microcontroller-based solutions by providing techniques (e.g., systems, devices, methods, and machine-readable media) for constructing, or operating, systems that are configured to execute operations, such as accessing to resources that shared within a computing node, or between distinct computing nodes, of the system with precise deterministic timing. In an example, such precise deterministic timing includes timing that has at least a sub-microsecond resolution. Other aspects of the present disclosure include providing programming constructs that enables systems to execute these operations in synchrony with a network time.

In an example aspect of the present disclosure, a computing system includes a processor core and one or more processing circuits, such as processors, co-processors, finite state machines, hardware accelerators or other processing circuits. The computing system can be configured to generate and access a network time signal. In an example, the network time signal is provided in a decimal time of day format (hereinafter, "time of day format"), such as a format that indicates time in as Hour:Minutes:Seconds:Subsecond. The network time signal can include any suitable signal used to determine the time of day. In an example, the network time signal has a resolution, or granularity, of at least ten nanoseconds. In another example, the computing system includes a real time sense and control (RTSC) engine (e.g., circuit and associated firmware modules) that is configured to execute instructions in synchrony, or in alignment, with the network time signal. In an example, the RTSC engine executes an instruction in response to the time signal indicating a specific time of day expressed as an absolute time, such as Sunday 12:30:00:00.00000000 PM. In another example, the RTSC engine executes an instruction based on an elapsed time expressed as a span of time (e.g., a relative time), such as 1500 nanoseconds after an indicated time or other synchronization point. As used herein, absolute time includes a single point of time in an epoch, where an epoch includes time expressed in a time of day formation (e.g., year, month, day, hour, minute, second, or one or more sub-second). Relative time is a period or quanta of time that is specified with reference to another point in time.

In another example aspect of the present disclosure, a system includes a network of two or more computing nodes (e.g., computing systems) that are configured with one or more RTSC engines. Each computing node can may be configured to receive a network time signal, such as from a network time server, and synchronize operation of its RTSC engine with this time signal. Such synchronization can include causing the RTSC engine to execute of one or more instructions or operations in synchrony with the network time signal. In an example, each computing node, or RTSC engine associated with the computing node, maintains an internal time signal in a time of day format that is synchronized with the network time signal and executes RTSC operations in synchrony with the internal time signal. This also enables the precise synchronous execution of instructions or operations across remotely connected computing systems or RTSC engines.

In another example aspect of the present disclosure, an RTSC engine is programmatically controlled through one or more RTSC scripts or routines that include one or more RTSC script language instruction. An RTSC script language instruction (hereinafter, "RTSC instruction" or "RTSC instructions") include low-level programming constructs, such as assembly language level instructions, that are executed by the RTSC engine with deterministic timing and ordering. Such deterministic time is ensured by requiring that each instruction executes within a predetermined number of fixed time slots. Such deterministic ordering requires that RTSC instructions are not reordered during script processing (e.g., during compilation, assembly, or interpretation) or execution. The RTSC instructions can be synchronized with a network time signal using the low-level programming constructs. Synchronization using such constructs can enable an RTSC engine to suspend, delay, or resume, execution of one or more RTSC instructions based on an absolute or relative time.

In another example aspect of the present disclosure, the RTSC script instruction set includes one or more instructions or associated programming constructs (e.g., timing parameters) that are configured to deterministically execute the instructions of an RTSC script, such as by causing an RTSC engine to execute instructions at a predetermined absolute time or at a time specified relative to the execution of another instruction or a predetermined delay (e.g., a relative time). The absolute time or the relative time may be specified, respectively, by an absolute or relative timing parameter in a time of day format.

In some examples, the relative timing parameter is specified using any format that is suitable indicated a specific span of time. RTSC engines may be configured with hardware registers or other storage circuits that operate in this time of day format, such as to generate, capture, update, and operate on network time signals that are specified in a time of day format (hereinafter, "real time signal") without conversion into an intermediate format.

In another example aspect of the present disclosure, an RTSC engine is configured to execute RTSC instructions in synchrony with at deterministic time of day points specified according to a configurable time granularity, such as a multiple of a specified number of nanoseconds (ns). The RTSC engine accomplishes this by dividing time into a set of time slots and guaranteeing that each RTSC instruction will execute within a predetermined number of time slots. Nondeterministic instructions, such as instructions whose execution cannot be guaranteed to finish within a predetermined number of times slices (e.g., some input-output instructions or operations), are allocated a specified amount of time (e.g., a specified number of time slots) to complete execution. The execution of such instructions fail if execution is not completed within the allocated time.

In another example aspect of the present disclosure, an RTSC engine guarantees the precise timed execution of instructions that access hardware resources through the use of resource reservation and configuration elements (e.g., file partitions, tables, associated files, or other data objects) that are associated with an RTSC script file. More specifically, the resource reservation and configuration elements identify resources (e.g., hardware resources) that will be used in an RTSC script and specify how an identified resource will be used in the script. In an example, the resource reservation and configuration elements associated with an RTSC script may indicate that one or more RTSC script instructions will use a shared data bus a specified time of day to transfer a block of data. RTSC script validation tools analyze each RTSC script (and their associated resource reservation and configuration elements) that will execute on a computing node to identify any resource reservation conflicts that could result in timing violations.

FIG. 1 depicts an example of a system 100 having computing nodes 115 and 120A-120J that provide precision timed access to hardware resources. The system 100 includes a user computing resource 105, data communication network 110, and a mesh network 125. The user computing resource 105 is configured to communicate with the mesh network 125 using the data communication network 110. In an example, the data communication network

110 includes a local area network, a wide area network, the internet, or any other suitable wired or wireless data communication network. Elements of the mesh network 125 are configured to communicate with each other using one or more data communication channels, such as through the use of a wireless transceiver.

The user computing resource 105 can include any suitable computing resource, such as an endpoint device, a computing server, or network-based, or a hosted computing environment. The user computing resource 105 can also include a computing environment, or a partition of a computing environment, that is allocated to a user of a computing system. In an example, the user computing resource 105 is configured with hardware circuits or software applications, such as a software development suite, for developing user applications for, or distributing applications to, the mesh network 125. Developing such user applications can include generating and validating RTSC scripts, integrating such scripts into a user application, and compiling and assembling the scripts and the application into an executable binary file or other data object. In another example, the user computing resource 105 is configured with hardware circuits or software applications to manage the mesh network 125, such as by exchanging instructions, data, and timing information, with one or more of the computing nodes 115 and 120A-120J.

In an example, the mesh network 125 includes one or more distributed computing nodes 115 and 120A-120J that communicate with each over though a data communication channel, such as wireless communication channel established by radio transceivers associated with each computing node. In an example, computing nodes 115 or 120A-120J include computing devices (e.g., microcontrollers, systems-on-chip, computing systems, etc.) that are configured with one or more RTSC engines. One or more of the computing nodes 115 or 120A-120J can each be associated, or configured to interface, with one or more computer actuated hardware device 130, such as a sensor or an actuator. In an example, a computing node is configured to interface with the hardware device 130 to capture, process, or relay data that is generated or captured by such device while the computing node execute a process or task.

The mesh network 125 can include a gateway computing node 115 and one or more network computing nodes 120A-120J. The gateway computing node 115 can be configured to communicate with the user computing resource 105 via the data communication network 110 or with one or more network nodes 120A-120J. The network computing nodes 120A-120J can communicate with the user computing resource 105 through the gateway computing node 115. The network computing nodes 115 or 120A-120J can communicate with each other, and with the gateway computing node 115 though one or more direct or indirect data mesh network communication links. In some examples, the gateway computing node 115 and the network computing nodes 120A-120J provide substantially similar functions and are used interchangeably.

In operation, the mesh network 125 is configured to monitor an environment using one or more hardware device 130. In an example, the gateway computing node 115 or one or more of the network computing nodes 120A-120J are configured, such as by a user application or RTSC script, to capture, process, and relay sensor data to the user computing resource 105 according to a specified timing relationship. In an example, timing relationship includes a requirement that one or more nodes capture sensor data at precisely a specified time of day, such as at 12:00:00:00.00000000 PM. In another example, the timing relationship includes a requirement that a first computing node capture sensor data synchronously with a second computing node. To enforce these timing relationships, the user computing resource 105 or the data communication network 110 provides a network time signal (e.g., a global time signal) to the mesh network 125, such as through the gateway computing node 115. Each computing node in the mesh network synchronizes their internal time signal with the network time signal. RTSC engines within each computing node execute RTSC script instructions in times slices that are synchronized to the network time signal.

Figure 2:
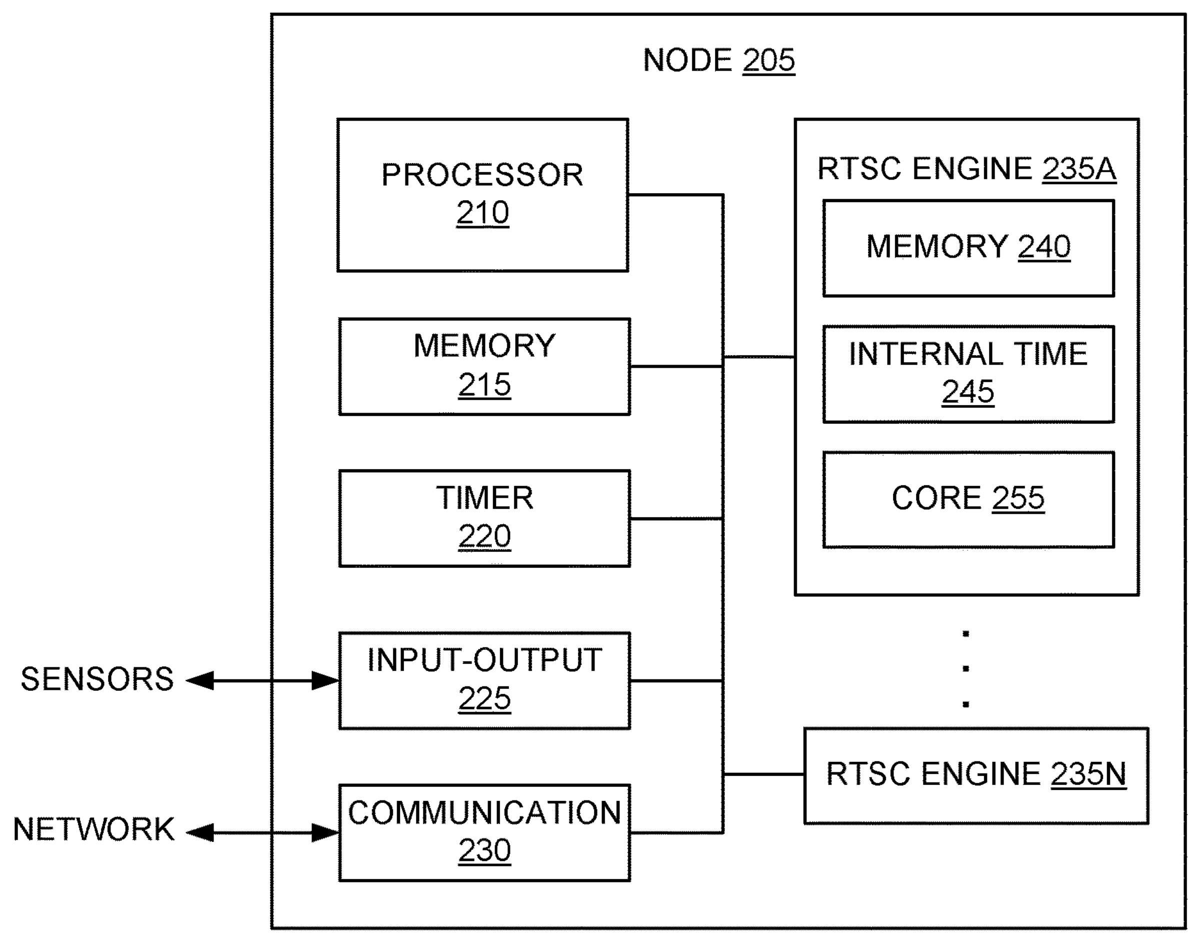
FIG. 2 is a block diagram that depicts an example of a computing node that is configured to provide precision timed access to hardware resources.

FIG. 2 depicts an example of a computing node 205 that is configured with one or more RTSC engines to provide precision timed access to hardware resources. The computing node 205 is an example of the gateway computing node 115 or the network computing node 120A-120J, as shown in FIG. 1. In an example, the computing node 205 includes a processor 210, a memory 215, a timer element 220, an input-output element 225, communication element 230, and RTSC engines 235A-235N. The processor 210 can execute one or more user provided applications to control the operation of the computing node 205. In an example, the processor 210 can load a user application that includes one or more RTSC scripts to execute on one or more of the RTSC engines 235A-235N. The processor 210 can then execute the application by configuring the RTSC engines 235A-235N with the RTSC scripts and triggering execution of the scripts. The processor 210 can also aggregate, process, and relay data generated by the RTSC engines to a user computing resource, such as the user computing resource 105 (FIG. 10). The memory 215 is configured to store data, related timing information, configuration information, applications, and scripts that are usable by the processor 210 or the RTSC engines 235A-235N.

The timer element 220 include one or more circuits for generating or maintaining an internal time signal. The timer element 220 can include one or more circuits for synchronizing the internal time signal with a network time signal. In an example the timer element 220 includes a clock circuit, a base register for initializing or synchronizing the internal time signal to another time signal, and a counter register for storing the number of timing units that have passed since the initialization, and a clock circuit for updating the counter register. In an example, the base register is adjusted by software that executes on the processor 210 to synchronize the internal signal with a network time signal or a coordinated universal time (UTC). In an example, the timer element 220 includes control registers and other circuits for configuring or generating an internal signal for each RTSC engine in the computing node 205. Such control registers are configured to configure, generate, or store, the internal time signal in a time of day format.

The input-output interface 225 can include one or more circuits for interfacing with one or more external hardware devices, such as a sensor or an actuator (e.g., hardware device 130). Such interfacing can include, exchanging configuration information, control signals, data or any other information with the hardware device. As used herein, a sensor can include any device that is configured to measure environmental conditions or the physical properties, characteristics, or states of an object. As used herein, actuators include any device or circuit, including some sensors, that are controllable or actuatable by the computing node 205.

The communication element 230 can include any suitable interface for exchanging information over a data communication network or for mesh or pair-to-pair network. In an example, the communication interface 230 includes a network interface card, such as an ethernet card for interfacing with a data communication network, or a radio transceiver, such as for communicating with other computing nodes.

The RTSC engine 235A-235N can include one or more integrated circuit (IC) hardware blocks that are configured to provide users with precise programmatically timed access to hardware resources, such as a peripheral bus, memory, or other hardware resource or device. In an example, each of the RTSC engines 235A-235N is configured to synchronously execute RTSC scripts and to maintain deterministic timing when accessing a share resources, such as a shared data communication bus or a shared memory.

The RTSC engine 235A can include a memory 240, an internal time element 245, and a core 255. The memory 240 can include latches, registers, or other memory circuits that are configured to store data, configuration information, RTSC operations, or any other data that is useful for the operation of RTSC engine. The internal time element 245 can include any circuit that is configured to provide a time signal that is synchronized with a network time and represented in time of day format. In an example, one or more RTSC instructions can be executed in synchrony with a time indicated by the internal time element 245. In an example, the internal time element 245 includes a clock circuit, a base register, and a count register. In another example, one or more elements or components of the internal time element 245 is disposed in the timer element 220. The core 255 can include one or more processing circuits, such as a microprocessor or a finite state machine. In an example, the core 255 is configured to execute RTSC instructions, as described herein. In an example, executing such RTSC instructions include executing operations to control one or more hardware resources of the computing node 205 in accordance to a specified timing requirement, such as by executing RTSC instructions in predetermined time slots that are synchronized to network time as represented by the internal time element 245. In an example, executing such RTSC instructions include capturing, retrieving, and processing sensor data or other information, and providing the processed information to the computing node 205 for further processing or distribution. In an example, executing such RTSC script instructions includes the dedication, or the precise allocation, of needed computing resources for the RTSC engine to execute RTSC instructions of a particular RSTC script, such as to ensure compliance with any timing requirements of such scripts.

Computing nodes that have disparate resources, such as processing power or speed, can be configured to execute RTSC scripts, such as to synchronously access shared hardware resources. In an example, a first computing node is configured to execute instructions or process data at a first clock rate, while a second computing node is configured to execute instructions or process data at a second clock rate. RTSC engines in the first and second computing nodes can synchronously execute RTSC instructions, notwithstanding the different processing speeds of each computing node, when execution of those instructions are tied to one or more time of day requirements based on their respective internal time element 245.

In an example, two or more RTSC engines within a computing node can execute RTSC instructions to synchronously access shared computing resources, such as in one or more pre-allocated timeslots, by synchronizing the execution of such instructions to specific time slots that are derived from, or synchronized with, a network time signal, such as provided by their respective internal time element 245. In another example, two or more RTSC engines that are disposed, respectively in two or more disparate computing nodes in a network, such as the mesh network 125, can synchronously execute RTSC instructions to perform a task in synchrony by synchronizing the execution of such instructions to specific time slots that are derived from, or synchronized with, a shared network time signal, such as provided by their respective internal time element 245.

Figure 3:
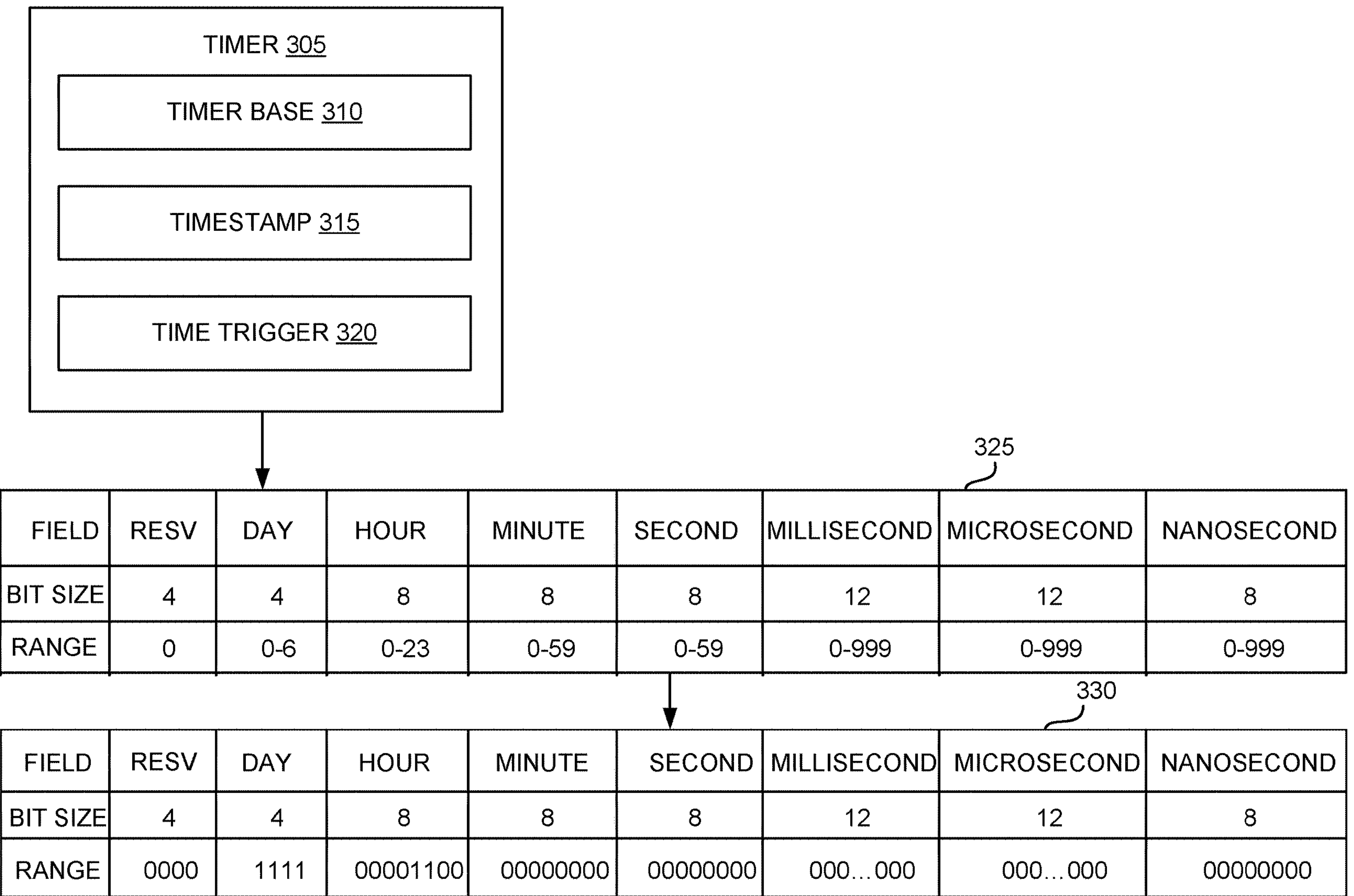
FIG. 3 is a block diagram that depicts an example of a timer component that is useful in a computing node that is configured to provide precision timed access to hardware resources.

FIG. 3 depicts an example of a timer element 305 of a computing node that is configured to provide precision timed access to hardware resources. The timer element 305 is an example of the timer element 220 or the internal timer element 245, as shown in FIG. 2. In an example, the timer 305 includes a base register 310, a timestamp register 315, or a time trigger register 320. In an example, the timer element 305 includes separate instances of such registers for each RTSC engine in a computing node, such as the computing node 205. The base register 310 can be used to initialize or synchronize an internal time signal of a computing node, or an internal time signal of an RTSC engine, to another time signal, such as a network time signal, by providing an initial or base timing value for use in real time calculations. Such calculations can include adding the initial timing value to an offset value, such as a timer count, to determine real time. The timestamp register 315 is configured to capture or latch the current real time value of the timer element 305, such as for use in an RTSC script instruction. The time trigger register 320 is configured to generate one or more interrupts (e.g., processor interrupts) or other events when a value of the internal or internal time signal matches or exceeds a real time value stored in the time trigger register. In an example, the interrupt is used to wake up a sleeping RTSC engine from a wait, suspended, or sleep state. In an example, the timer element 105 includes additional registers or storage circuits. Such additional registers can include time count registers, configuration registers, or reference registers, such as for using in script loop control operations.

In an example, one or more of the registers associated with the timer element 305 store time in a time of day format, such as indicated in table 325. The time of day format includes partitioning the register into one or more-bit fields such that each bit field is allocated to an indicated real time division, such as days, hours, minutes, seconds, and fractional seconds. In an example, 4-bits of a register are used to represent a day of the week, 8-bits are used to indicate an hour of the day, 8-bits are used to indicate minutes of an hour, another 8-bits are used to indicate seconds in a minute, and one or more addition sets of bits are used indicate fractional parts of a second. In an example a wildcard value can be associate with a bit field, such as a store a '1' in the most significant bit of the bit field. Any other suitable allocation of register bits can be used. The example register configuration and stored values shown in table 330 indicate the real time 12:00:00.000000000 on any day.

In addition to the foregoing, the timer element 305 can include one or more hardware circuits, such as clocks and signal processing circuits, for generating an internal time signal that is synchronized with a network time signal and represented in a time of day format.

Figure 4:
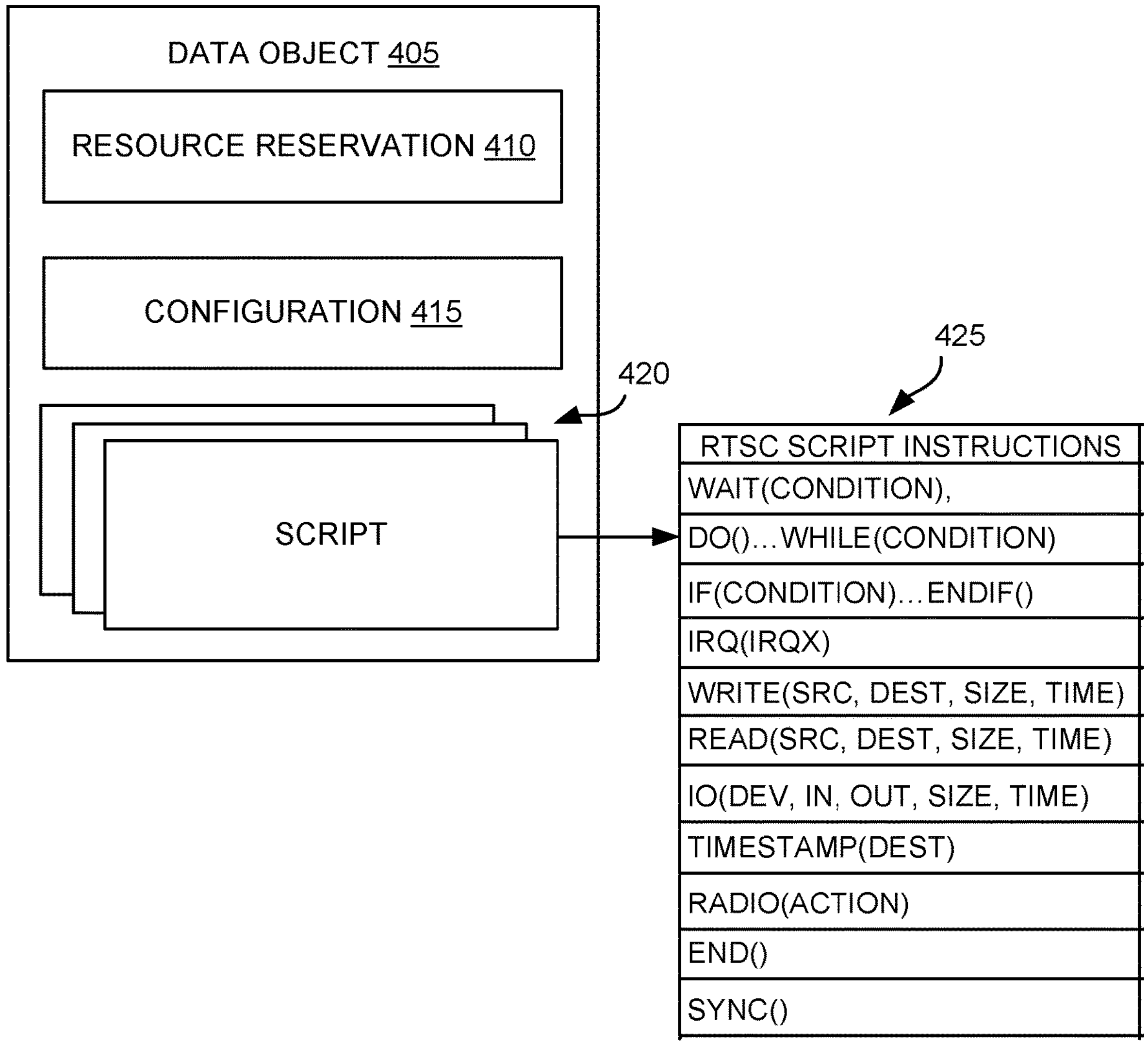
FIG. 4 is a block diagram that depicts an example of a data object for storing computer executable code for controlling a processing element of computing node that is configured to provide precision timed access to hardware resources.

FIG. 4 depicts an example of a data object 405 (e.g., a file, database, or other storage object) for storing computer executable code for controlling a processing element of a computing node, such as the computing node 205 (FIG. 2), that is configured to provide precision timed access to hardware resources. In an example, the data object 405 is an RTSC script file, such as generated by a user computing resource or an automated process. In an example, the data object 405 includes a reservation element 410, a configuration element 415, and a script element 420.

The reservation element 410 is used to identify one or more hardware resources that will be used by an RTSC script. In an example, the hardware resources include input-output devices, communication buses or interconnect fabrics, memory, communication interfaces, or any other hardware resource. In an example, an RTSC script can only use hardware resources that are identified in the resource reservation element 410. In an example only hardware resources that have deterministic access times are included in the resource reservation element 410. A hardware resources that has deterministic access times guarantees that operations to access the hardware resource will be completed within a specified span of time or within a predetermined number of time slots.

The configuration element 415 is used to define how each hardware resource identified in the reservation component will be used by an RTSC script. In an example, each hardware resource is associated with a set of one or more configuration parameters to define how the resource will be used at run time. In an example, a shared bus can have one or more configuration parameter to indicate times or time slots when a bus will be use by an RTSC script, the amount of data that will be transferred in an access, or a source or destination of the access. RTSC engines require deterministic access to some hardware resources in order to ensure precisely timed instruction execution or resource access. Information provided in the configuration element provides a declaration of how and when a hardware resource will be used by an RTSC script. This information can be used by a script validation application to identify any potential resource access conflicts.

The script element 420 includes one or more RTSC scripts that can be executed by an RTSC engine. In an example, the RTSC script is associated with, or includes an identifier that identifies, an RTSC execution engine that will execute the script. In an example, an RTSC script includes one or more instructions that are executable by an RTSC engine, such as to provide precise or synchronized timing access to hardware resources that are reserved in the reservation element 410 and that have a configuration in the configuration element 415.

As shown in Table 425, an RTSC script can include one or more flow control instructions (e.g., DO-WHILE or IF-ENDIF instructions), data movement instructions (e.g., WRITE or READ instructions), input-output instructions (e.g., IO or RADIO instructions), or script synchronization instructions (e.g., TIMESTAMP, WAIT, or SYNC instructions). A subset of these instructions includes a timing parameter. In an example the flow control instructions include a timing parameter for controlling the execution flow, such as by branching or suspending execution, based on an absolute or relative time. In another example, the data movement instructions include a timing parameter for controlling precisely when a read or write operation is executed. Similarly, the IO operation includes a timing parameter for controlling precisely the time at which a hardware device is accessed. In an example, the timing parameter for each of these instructions includes a time specified in a time of day format. In an example an RTSC execution engine evaluates and stores the timing parameter in the time of day format. In an example the timing parameter is specified as either an absolute or a relative time. Absolute timing parameters can be evaluated against the internal time signals, such as a time signal provided in a time counter or time stamp registers. Relative timing parameters are evaluated against a selected point in time, such as a point in time determined by a SYNC instruction or modifier or a point in time determined by the time at which an instruction was executed. In an example a relative timing parameter specifies an amount of time to elapse after a previously encountered SYNC instruction or modifier. In another example, a relative timing parameter specifies an amount of time to elapse after the execution (e.g., the start or end of execution) of an instruction before another instruction is executed.

In an example, a WAIT instruction causes the RTSC engine to suspend execution of a script until a specified timing condition is satisfied. In an example, the condition is satisfied when the internal or internal time signal matches or passes a time indicated by an absolute timing parameter. In another example, the condition is satisfied when a specified amount of time, such as indicated by a relative timing parameter, has elapsed after executing the wait instruction or after encounter a SYNC modifier or instruction.

In an example, the READ or WRITE instructions cause the RTSC engine to execute a data read or write transactions within a window of time, such as specified by a relative timing parameter. The instruction can be aborted if it is not completed before the end of the window of time.

In an example, the IO instruction causes the RTSC engine to IO transactions within a predetermined amount of time, such as specified by a relative timing parameter. Since some IO instructions are not deterministic, there execution times are bound to this predetermined amount of time to make them RTSC compatible.

In an example, a DO-WHILE instruction causes the RTSC engine to execute instructions following the DO construct if a condition indicated in the WHILE construct, such as specified by an absolute or relative timing parameter, is satisfied at a time when the WHILE construct is encountered.

In an example, an IF-ENDIF instruction causes the RTSC engine to execute instructions following the IF construct if an indicated condition is satisfied at the exact time that the IF construct is encountered. In an example, such condition is logical condition that includes timing element, such as specified as in an absolute or relative timing parameter. In another example, such condition is a logical condition that does not include a timing element.

The TIMESTAMP instruction is used to save the current real time at an indicated location (e.g., such as in register or an area of memory).

The SYNC instruction is used to set a synchronization point which can be used by other commands in conjunction with a relative timing parameter. The SYNC modifier is used to modify a relative timing parameter to make time relative to a previously executed SYNC instruction.

An RTSC script instruction can map directly to an assembly language instruction or to a small set of one or more assembly language instructions. Each assembly language instruction has a determinable execution time or duration. RTSC script instructions are executed without reordering operations to ensure precise deterministic execution. Each RTSC script instruction that includes a timing parameter, or that is executed after an instruction that includes a timing parameter, can be executed by an RTSC engine at a precise real time, such as at a time that is accurate within an indicated sub-second resolution, such as a 10 ns resolution.

Figure 5:
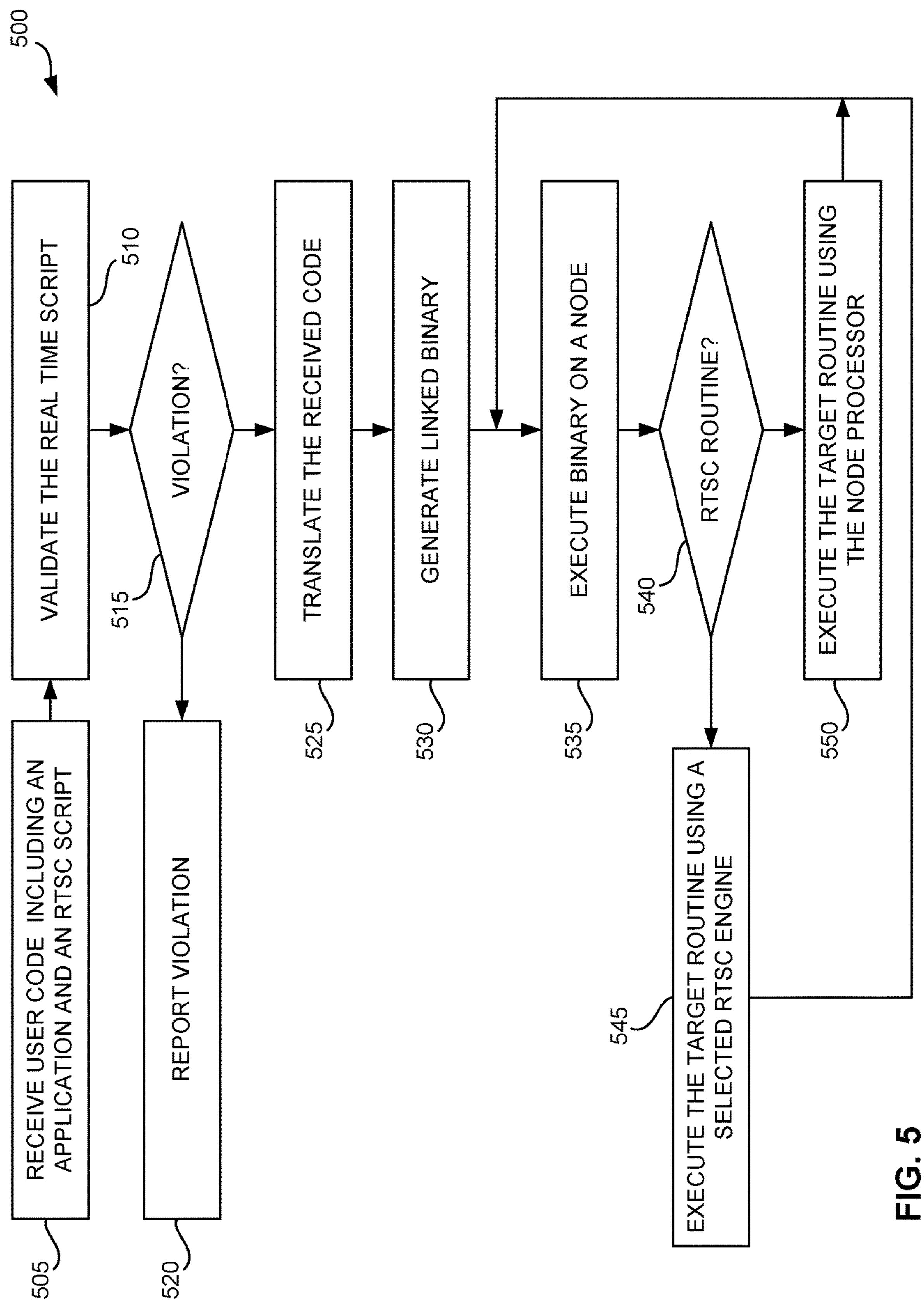
FIG. 5 is a flow chart that depicts an example of a process for configuring and operating a computing node that is configured to provide precision timed access to hardware resources.

FIG. 5 depicts an example of a process 500 for configuring and operating a computing node that is configured to provide precision timed access to hardware resources. The process 500 can be executed by one or more software applications to load an execute an RTSC script on a computing node, such as the computing node 205 (FIG. 1).

At 505, user code can be received. In an example, the user code includes a user application, such as for execution on a processor of the computing node, such as the processor 210. In another example, the user code includes an RTSC script, such as for execution on one or more RTSC engines, such as the RTSC engines 235A-235N. The RTSC script can be an example of the data object 405 or the script 420, as shown in FIG. 4.

At 510, the RTSC script is validated, such as by a script parser software application. In an example, the RTSC script is validated by analysing the reservation, configuration, and script elements to identify any hardware resource usage will cause a conflict during execution. In an example, the RTSC script is validated by analysing the reservation, configuration, and script elements to identify any timing violations, such as timed instruction execution that cannot be guaranteed to execute at a specified time.

At 515, it is determined whether the user code received at 505 includes any hardware usage violations, timing violations, or any other errors. The process 500 continues at 520 when a violation is detected, while the process 500 proceeds to 525 when a violation is not detected.

At 520, detected violations are reported, such as to a user computing resource. In an example, reporting a violation include identifying the resource or time conflict along with one or more RTSC scripts or RTSC script instructions that that are associated with the violation. In an example, reporting a violation can include providing one or more recommendations for correcting the violation.

At 525, the user code can be translated into machine code. In an example, translating the user code includes compiling and assembling the user application. In an example, translating the user code includes translating the RTSC script into one or more RTSC assembly language routines while preserving instruction ordering and execution timing, and assembling the translated routines.

At 530, the assembled user application and RTSC routines can be linked, such as to form binary application file. The binary application file can then be stored in a memory of the computing node.

At 535, the binary application file can be executed by the computing node. In an example, executing the binary application file includes loading the binary application file into a memory of the computing node and configuring RTSC engines with their respective assembled RTSC routines.

At 540, the computing node determines whether the code in binary application file includes a call to an RTSC routine. The process 500 continues at 545 when the code includes a call to an RTSC routine, while the process 500 proceeds to 550 when the code does not include a call to an RTSC routine.

At 545, the RTSC routine can be executed by a target RTSC engine, while at 550, execution continues on the node processor.

While the operations in FIG. 5 are shown as happening sequentially in a specific order, in other examples, one or more of the operations may be performed in parallel or in a different order.

The process 500 can include any other steps or operations for implementing the techniques described herein. In an example the process 500 can include one or more steps for synchronizing an internal or internal time signal generated by the computer node with a network time signal.

Figure 6:
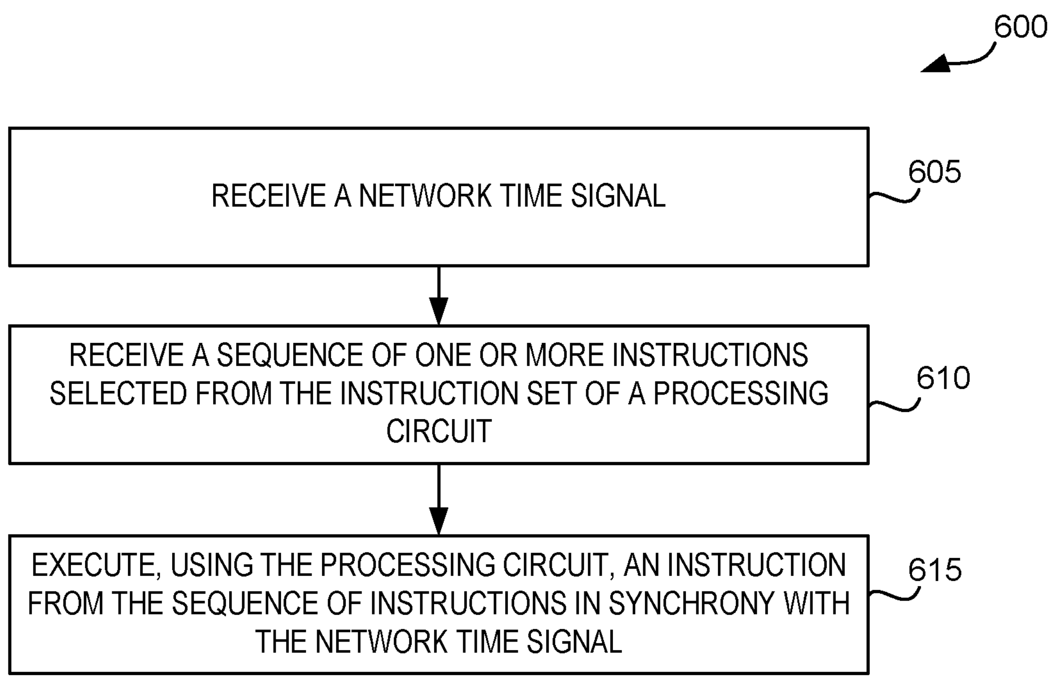
FIG. 6 is a flow chart that depicts an example of a process for operating a computing node that is configured to provide precision timed access to hardware resources.

FIG. 6 depicts an example of a process 600 for operating a computing node that is configured to provide precision timed access to hardware resources. The process 600 can be executed by a computing node processor, such as the processor 210, or by an RTSC engine, such as the RTSC engine 235A-235N. At 605, a network time signal is received, such as from a gateway computing node, a data communication network, or a user computing resource. In an example, the network time signal indicates global or coordinated universal time (UTC time). In an example, the computing node synchronizes an internal or internal time signal to the network time signal, such as by adjusting the value of base time register associated with a timer element or an RTSC engine. At 610, a sequence of one or more instructions can be received. In an example the instructions are selected from an instruction set of the RTSC engine and may include an absolute or relative timing parameter, such as for synchronizing execution of the instructions with the network time signal. At 615, the instructions are executed by an RTSC engine in synchrony with the network time signal. In an example, executing the instruction in synchrony with the network time signal includes executing the instruction to satisfy a sub-second instruction execution timing requirement.

The process 600 can further include any other steps any other suitable steps or operations for implementing the techniques described herein.

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects (e.g., examples) of the invention, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. An example may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects of the invention. Also, in the above Detailed Description, various features may be grouped together to streamline the disclosure. This should not be interpreted as intending that a disclosed feature that is not described in an aspect is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspect, along with the full scope of equivalents to which such aspects are entitled.

The claimed invention is:

1. A system for providing synchronous access to hardware resources in a wireless network, the system comprising:

first network interface element to receive an absolute network time-of-day signal from a wireless data communication network;

a memory to store a sequence of one or more instructions from an instruction set of a first processing circuit, the sequence of one or more instructions comprising a stored first instruction that includes an embedded relative predetermined execution time, in time-of-day, relative to the absolute first network time-of-day signal; and the first processing circuit is configured to use the first instruction and the embedded relative first predetermined execution time, in time-of-day, relative to the absolute first network time-of-day signal, to synchronize execution of a stored second instruction with the absolute network time-of-day signal, wherein the first processing circuit comprises a first synchronization element to:

synchronize a first internal clock with the absolute network time-of-day signal; and execute the sequence of one or more instructions in synchrony with the first internal clock, wherein the first processing circuit is configured to wirelessly couple to a second system by the wireless data communication network, wherein the second system includes:

a second network interface element to receive the absolute network time-of-day signal from the wireless data communication network; and a second processing circuit to execute a third instruction in synchrony with execution of the second instruction by the first processing circuit by using the absolute network time-of-day signal, wherein the second processing circuit includes a second synchronization element to:

synchronize a second internal clock with the absolute network time-of-day signal; and execute a second sequence of one or more instructions in synchrony with the second internal clock.

2. The system of claim 1, wherein the first processing circuit comprises a synchronization element to use the stored first instruction and the embedded relative predetermined execution time associated with execution of the stored second instruction to execute the stored second instruction in synchrony with the absolute network time-of-day signal by delaying execution of the stored second instruction until a time indicated by the absolute network time-of-day signal corresponds to a time indicated by the embedded relative predetermined execution time associated with execution of the stored second instruction.

3. The system of claim 1, wherein the first processing circuit comprises a synchronization element to use the stored first instruction and an embedded "off" time indicated using the embedded relative predetermined execution time, in time-of-day, associated with execution of the stored second instruction to execute the second instruction in synchrony with the absolute network time-of-day signal by executing the stored second instruction until a time indicated by the network time signal corresponds to a time indicated by the embedded relative predetermined execution time associated with execution of the stored second instruction.

4. The system of claim 1, wherein the first processing circuit comprises a synchronization element to use the stored first instruction and the embedded relative predetermined execution time associated with execution of the stored second instruction to execute the stored second instruction in synchrony with the absolute network time-of-day signal by executing the stored second instruction in response to an evaluation of a condition responsive to a time indicated by the absolute network time-of-day signal corresponding to a time indicated by embedded relative predetermined execution time associated with execution of the stored second instruction.

5. The system of claim 1, wherein the first processing circuit is electrically isolated from the second processing circuit.

6. The system of claim 1, wherein the second instruction comprises the first instruction.

7. The system of claim 1, wherein the relative predetermined execution time associated with execution of the second instruction comprises an absolute point in time determined by evaluating the relative predetermined execution time against an internal clock.

8. The system of claim 1, wherein the relative predetermined execution time associated with execution of the second instruction comprises a relative point in time determined by a synchronization instruction related to the absolute network time-of-day signal.

9. A method of processing source code for a computer program, the method comprising:

receiving, from a wireless data communication network, a stored sequence of source code instructions for the computer program, at least one instruction of the stored sequence of source code instructions comprising a relative predetermined execution time requirement, in time-of-day, relative to an absolute real-time timing requirement that specifies a time to execute the stored sequence of source code instructions, the relative predetermined execution time requirement being based on the absolute real-time timing requirement;

determining, using a first computing node, whether a first processing circuit can execute the sequence of source code instructions to satisfy the relative predetermined execution time requirement that is based on the absolute real-time timing requirement;

providing, to the first processing circuit, the stored sequence of source code instructions for execution responsive to determining that the first processing circuit can execute the stored sequence of source code instructions to satisfy the relative predetermined execution time requirement;

determining, using a second computing node, whether a second processing circuit can execute the sequence of source code instructions to satisfy the relative predetermined execution time requirement that is based on the absolute real-time timing requirement; and providing, to the second processing circuit, the stored sequence of source code instructions for execution responsive to determining that the second processing circuit can execute the stored sequence of source code instructions to satisfy the relative predetermined execution time requirement.

10. The method of claim 9, wherein providing the stored sequence of source code instructions to the first processing circuit for execution comprises generating, using the stored sequence of source code instructions, a stored sequence of machine executable instructions, wherein the machine executable instructions are executable by the first processing circuit within an indicated time period.

11. The method of claim 9, wherein determining whether the first processing circuit can execute the stored sequence of source code instructions to satisfy the relative predetermined execution time requirement comprises:

determining that a first instruction in the sequence of source code instructions accesses a resource that is shared between the first processing circuit and a second processing circuit, wherein access to the shared resource is time divided into one or more real-time slots; and determining that the sequence of source code instructions can be executed to cause the first instruction to access the resource using at least one available real-time slot of the one or more real-time slots to satisfy the execution time requirement.

12. A system for providing synchronous access to hardware resources in a wireless network, comprising:

a first computing node including:

a first processing circuit including:

a memory storing a first set of instructions; and a first relative embedded predetermined execution time signal to synchronize execution of the first set of instructions; and a second computing node in wireless communication with the first computing node, the second computing node including:

a second processing circuit including:

a memory storing a second set of instructions; and a second relative embedded predetermined time signal to synchronize execution of the second set of instructions;

wherein the second computing node is configured to:

determine whether the second processing circuit can execute the second set of instructions to satisfy a relative predetermined execution time requirement that is based on an absolute real-time timing requirement; and provide the second set of instructions to the second processing circuit for execution responsive to determining that the second processing circuit can execute the second set of instructions to satisfy the relative predetermined execution time requirement, wherein the first processing circuit and the second processing circuit are configured, respectively, to synchronously execute the first set of instructions and the second set of instructions by synchronizing the first relative embedded predetermined time signal and the second relative embedded predetermined time signal with an absolute network time-of-day signal.

13. The system of claim 12, wherein the first set of instructions comprises a first stored instruction that is configured to synchronize execution of a second stored instruction of the first set of instructions with the first relative embedded predetermined signal.

14. The system of claim 13, wherein first processing circuit is configured use the first relative embedded predetermined signal to synchronize execution of the first set of instructions by executing the first stored instruction to cause the second processing circuit to delay execution of the second stored instruction until the absolute network time-of-day signal corresponds to an indicated time.

15. The system of claim 13, wherein the first stored instruction comprises a real time signal parameter for indicating a real time signal to execute the second stored instruction, the time indicated in a decimal time format.

16. The system of claim 12, wherein the first processing circuit is configured to provide access to a relative embedded predetermined signal in a decimal time format.

17. The system of claim 12, wherein the first processing circuit and the second processing circuit generate the first relative embedded predetermined signal and the second relative embedded predetermined signal based on respective independently running clocks.

* * * * *